US009085897B2

(12) United States Patent
Quine (10) Patent No.: US 9,085,897 B2
(45) Date of Patent: Jul. 21, 2015

(54) SPACE ELEVATOR

(75) Inventor: Brendan Mark Quine, Cookstown (CA)

(73) Assignee: THOTH TECHNOLOGY INC., Pembroke, ON (CA)

( * ) Notice: Subject to any disclaimer, the term of this patent is extended or adjusted under 35 U.S.C. 154(b) by 979 days.

(21) Appl. No.: 12/524,130

(22) PCT Filed: Feb. 21, 2008

(86) PCT No.: PCT/CA2008/000340
§ 371 (c)(1),
(2), (4) Date: Mar. 2, 2010

(87) PCT Pub. No.: WO2008/101346
PCT Pub. Date: Aug. 28, 2008

(65) Prior Publication Data
US 2010/0163683 A1    Jul. 1, 2010

(51) Int. Cl.
*B64G 5/00* (2006.01)
*E04B 1/98* (2006.01)
*B66B 9/00* (2006.01)
*B64G 1/00* (2006.01)

(52) U.S. Cl.
CPC ............... *E04B 1/985* (2013.01); *B64G 1/002* (2013.01); *B64G 5/00* (2013.01); *B66B 9/00* (2013.01)

(58) Field of Classification Search
CPC ...................................................... E04B 1/985

USPC ........................ 244/158.5; 52/2.13, 2.21, 2.22
See application file for complete search history.

(56) References Cited

U.S. PATENT DOCUMENTS

| 2,990,836 | A | * | 7/1961 | Bird ............................... 52/2.22 |
| 3,388,509 | A | * | 6/1968 | Mora .............................. 52/2.15 |
| 4,320,602 | A | * | 3/1982 | Richardson ......................... 52/1 |
| 4,730,797 | A | * | 3/1988 | Minovitch ................. 244/158.3 |
| 5,527,216 | A | * | 6/1996 | Senanayake ....................... 454/1 |
| 8,881,471 | B1 | * | 11/2014 | Theobald ......................... 52/148 |

OTHER PUBLICATIONS

Bolonkin, Alexander Optimal Inflatable Space Tower with 3-100kin Height, JBIS, 2003, vol. 56, pp. 87-97.*

* cited by examiner

*Primary Examiner* — Brian M O'Hara

(57) ABSTRACT

A freestanding space elevator tower for launching payloads, tourism, observation, scientific research and communications. The space elevator tower has a segmented elevator core structure, each segment being formed of at least one pneumatically pressurized cell. The pressure cells may be filled with air or another gas. Elevator cars may ascend or descend on the outer surface of the elevator core structure or in a shaft on the interior of the elevator core structure. A payload may be launched from a pod or deck at the upper end of the space elevator tower. The space elevator tower is stabilized by gyroscopic and active control machinery. The space elevator tower maintains a desired pressure level through gas compressor machinery. Methods of constructing the space elevator are also disclosed.

27 Claims, 11 Drawing Sheets

SPACE ELEVATOR

FIELD

This invention relates to space elevators, and more particularly to a freestanding space elevator tower.

BACKGROUND

In order to access space or near space, payloads must gain significant potential and kinetic energy. Traditionally, regions above 50 km in altitude can only be accessed using rocketry, where mass is expelled at high velocity in order to achieve thrust in the opposite direction. This process is extremely inefficient as rockets must counter the gravitational force during the flight by carrying mass in the form of propellant and must overcome atmospheric drag. In contrast, if a payload is hauled to space or near space along an elevator system, the work done is significantly less as no expulsion mass must be carried to do work against gravity, and lower ascent speeds in the lower atmosphere can virtually eliminate atmospheric drag. Elevator cars' motion may also be powered remotely by electrical or inductive means, eliminating the need to carry any fuel.

It has previously been proposed, most famously by Arthur C. Clarke in his 1978 novel, *The Fountains of Paradise*, that a space elevator could be constructed using a cable and counter-balanced mass system. For Earth's gravity and spin rate, such a solution requires a cable of at least 35,000 km in length and a counter balance mass similar to a small asteroid. Such a system could be constructed by launching the cable into space or manufacturing it in situ and lowering it into contact with Earth. However, the technological obstacles that must be overcome, including the construction of a cable with suitable strength characteristics or the in-space construction of the apparatus, have not been realized since the concept was popularized by Clarke. Known materials are simply not strong enough to enable the construction of a cable of that length that would even be capable of supporting its own weight.

SUMMARY

The present invention is a self-supporting space elevator tower for the delivery of payloads to at least one platform or pod above the surface of the Earth for the purposes of space launch. The space elevator tower may also be used to deliver equipment, personnel and other objects or people to at least one platform or pod above the surface of the Earth for the purpose of scientific research, communications and tourism. While the described space elevator tower can provide access to lower altitude regions, the space elevator tower can also be scaled to access altitudes above, for example, 15 km, the typical ceiling altitude for commercial aviation. The space elevator tower can be further scaled to provide direct access to altitudes above 200 km and with the gravitation potential of Low Earth Orbit (LEO).

Although ascending to an altitude significantly below 35,000 km will not place a payload in Earth orbit, a platform or pod supported by the space elevator tower has significant advantages over a surface-based launch platform. While surface-based rockets must be designed to overcome atmospheric air resistance, launch from a high-altitude platform has no such requirement, and, consequently, existing space equipment such as an orbital transfer stage or conventional upper stage can be used to insert payloads directly into Earth orbit. Ideally, payloads should be raised to the highest feasible altitude before launching in order to maximize the energy advantages; however, the energy advantages for space flight are readily leveraged above 5 km.

A platform or pod supported by the space elevator tower also has significant advantages over orbiting satellite platforms. Geographically fixed, but providing access to regions of space closer to the surface than geostationary orbit, elevator platforms provide the ideal means to communicate over a wide area and to conduct remote sensing and tourism activities. As a tourist destination, the elevator platforms provide stations located at fixed attitudes from the surface for observation. The elevator platforms provide the means to safely access a region of space with a view extending hundreds of kilometers.

The space elevator tower may also provide a near-surface observation platform with oversight over a fixed geographical area. Such platforms can be used for observation, remote sensing and communications. Small systems may be mobile and delivered to sites for temporary applications for example to provide temporary communications towers typically between 25 m and 150 m. Used with an elevator component equipment may be accessed and maintained during operation. Used without an elevator component, equipment may be installed only during the construction of the apparatus.

The invention provides in one aspect, a freestanding space elevator tower, comprising a segmented elevator core structure. More specifically, in accordance with one aspect of the present invention, there is provided a space elevator tower for location on a planetary surface, the space elevator tower comprising a pneumatically pressurized structure that is at least partially formed from flexible sheet material and is at least partially supported by internal gas pressure, the space elevator tower including a main pod at the top thereof, providing at least one of: a launch device for launching objects from the main pod, and a platform for at least one person or for communications; and remote sensing equipment.

The tower can include at least one stabilization device attached to the pneumatically pressurized structure to provide at least partial active stabilization.

The invention provides in another aspect, an elevator core structure for a space elevator, the elevator core structure comprising a series of core segments, the core segments comprising at least one or more pneumatically pressurized pressure cells.

The invention provides in another aspect, a core segment for an elevator core structure in a space elevator tower, the core segment comprising at least one pneumatically pressurized pressure cell.

The invention provides in another aspect a method for the active control of the elevator structure comprising an apparatus that adjusts pneumatically and by other means the attitude of the core structure in order to null external forces, eliminate structural bending moments and maintain the core structure over it's footprint.

The invention provides in another aspect, a method of constructing an elevator core structure for a space elevator tower, the method comprising:
a) extruding core segments from a fluid core material;
b) embedding pods containing control and stabilization machinery in the core segments as they are extruded; and,
c) raising the pods, preferably using a roller system and pneumatics.

The invention provides in another aspect, a method of constructing an elevator core structure for a space elevator tower, the method comprising:

a) raising a core segment with a climbing construction elevator that grips the outer surface of the existing elevator core structure;
b) sliding the core segment on top of the existing elevator core structure on a horizontal track on the climbing construction elevator; and,
c) actively adjusting the centre of mass of the existing elevator core structure to maintain the elevator core structure over its footprint.

Further aspects and advantages of the invention will appear from the following description taken together with the accompanying drawings.

BRIEF DESCRIPTION OF THE DRAWINGS

For a better understanding of the present invention and to show more clearly how it may be carried into effect, reference will now be made, by way of example, to the following drawings, in which.

DETAILED DESCRIPTION

Figure 1:
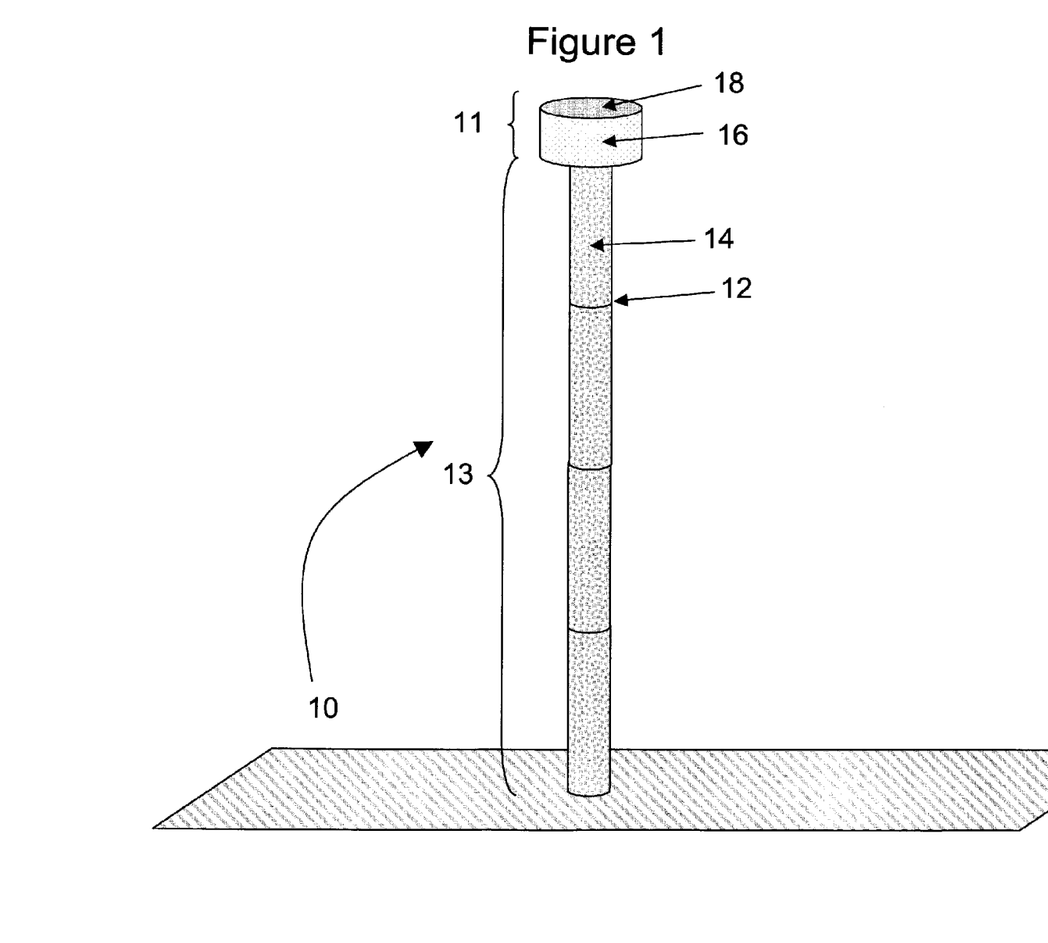
FIG. 1 is an isometric view of one embodiment of a space elevator tower.

FIG. 1 illustrates a segmented space elevator tower 10 built in accordance with a first embodiment of the present invention. Specifically, the space elevator tower 10 has an upper end 11 and a lower end or main tower portion 13. The lower end 13 comprises an elevator core structure 12 having a plurality of core segments 14 stacked end-to-end along the length of the elevator core structure 12. The upper end 11 of the space elevator tower 10 comprises a main pod 16 and a platform 18. The main pod 16 and the platform 18 are supported by the elevator core structure 12.

The elevator core structure 12 has mechanical and structural supports (not shown) for ascending and descending elevator cars (not shown). The elevator cars may be used to transport equipment, payloads, personnel, tourists or other loads to the main pod 16 and platform 18, or to any point along the length of the elevator core structure 12. In one embodiment, an elevator car may ascend the space elevator tower 10 on the exterior surface of the elevator core structure 12 on tracks (not shown) or by a device that grips the outside of the elevator core structure 12. In alternative embodiments, the elevator cars may ascend and descend the space elevator tower through a shaft located on the interior of the elevator core structure 12. Since the elevator cars may remain in contact with the elevator core structure during the entire ascent or descent, the mechanism for elevating and lowering the elevator cars may be provided by frictional contact, at least one winch mechanism located along the length of the elevator core structure, or by inductive means or by any other suitable means. The elevator cars may be self-powered, or may derive their power pneumatically, electrically, magnetically or inductively from the elevator core. In some embodiments, the elevator cars may use more than one mechanism during an ascent or descent.

Stations and other buildings and structures may be provided inside the core segments 14 along the elevator core structure 12 at convenient locations for disembarkation of passengers and cargo. Given the mass restrictions, these structures will be of lightweight design and may include pressurized zones with airlock access from elevator cars in order to provide accommodation and amenities.

Please note that the two-digit numbers corresponding to parts of the space elevator tower 10 are included, as the last two digits of a three digit reference, wherever a generic reference is made to a component of the various embodiments of the space elevator tower.

FIGS. 2A-2E illustrate examples of alternate embodiments of the space elevator tower. Similar components of the space elevator tower are similarly numbered.

Figure 2A:
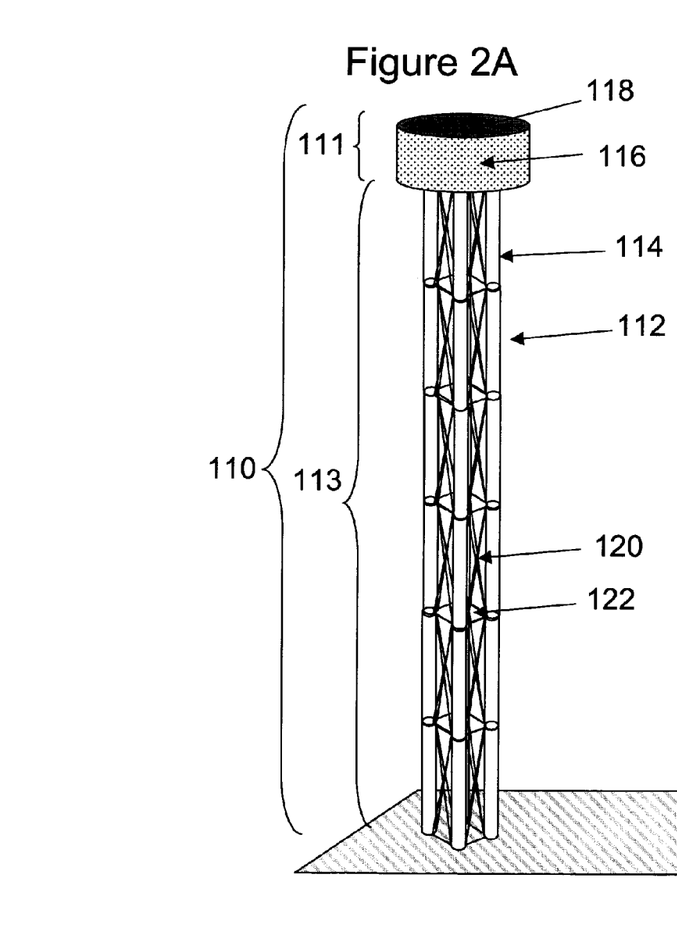
FIG. 2A is an isometric view of a second embodiment of the space elevator tower.

FIG. 2A illustrates an alternative embodiment of the space elevator tower 110 having an upper end 111 and a lower end, or main tower portion, 113. The lower end 113 comprises an elevator core structure 112 having a plurality of core segments 114 stacked end-to-end along the length of the elevator core structure 112. The elevator core structure 112 supports a main pod 116 and a platform 118 at the upper end 111 of the space elevator tower 110. The core segments 114 are arranged in a four-square configuration with an open lattice brace structure 120. Each four-square configuration of the core segments may support a deck 122 at convenient locations for disembarkation of passengers and cargo, and the deck 122 can form part of the structure maintaining the relative locations of core segments 114.

Figure 2B:
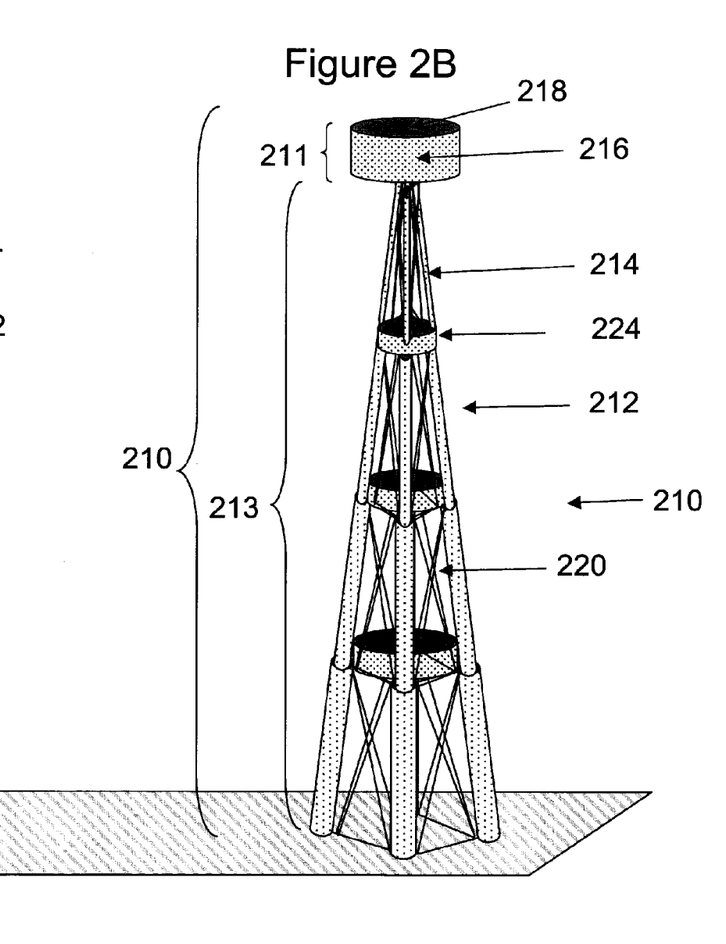
FIG. 2B is a third embodiment of the space elevator tower.

FIG. 2B illustrates an alternative embodiment of the space elevator tower 210 having an upper end 211 and a lower end, or main tower portion, 213. The lower end 213 comprises an the elevator core structure 212 having a plurality of core segments 214 stacked end-to-end along the length of the elevator core structure 212. The elevator core structure 212 supports a main pod 216 and a platform 218 at the upper end of the space elevator tower 210. The core segments 214 are arranged in a tapered four-square configuration with an open lattice brace structure 220. Each tapered four-square configuration of the core segments may support a pod 224 at convenient locations for disembarkation of passengers and cargo. The pods 224 can act as way-stations, to provide amenities, and for storage to house stabilization mechanisms and, as in FIG. 2A, can form part of the structure maintaining the relative locations of the core segments 214.

Figures 2C, 2D, 2E:
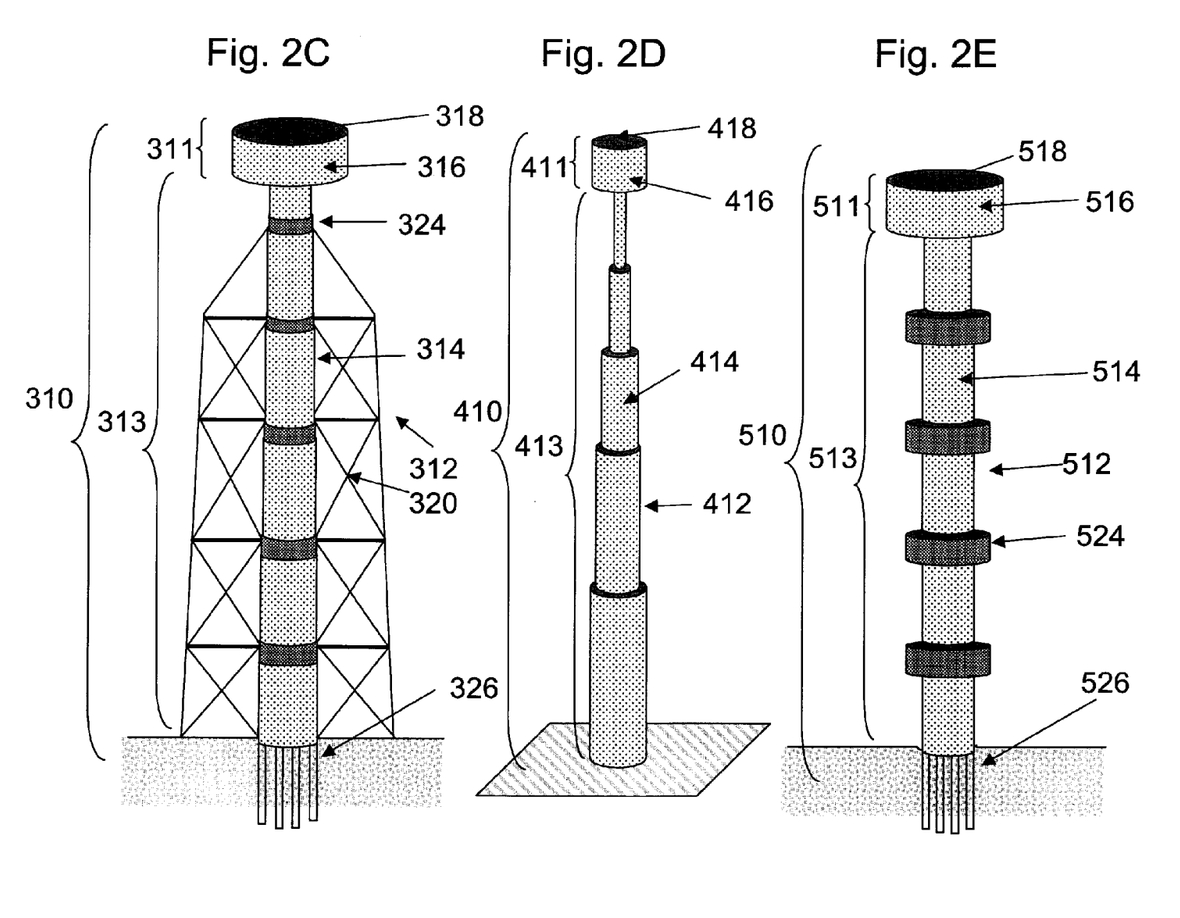
FIG. 2C is a fourth embodiment of the space elevator tower.
FIG. 2D is a fifth embodiment of the space elevator tower.
FIG. 2E is a sixth embodiment of the space elevator tower.

FIG. 2C illustrates an alternative embodiment of the space elevator tower 310 having an upper end 311 and a lower end, or main tower portion, 313. The lower end 313 comprises an elevator core structure 312 having a plurality of core segments 314 stacked end-to-end along the length of the elevator core structure 312. The elevator core structure 312 supports a main pod 316 and a platform 318 at the upper end 311 of the space elevator tower 310. The core segments 314 are supported with an external open lattice brace structure 320; while this is only shown for two opposite sides of the tower 310, this brace structure 320 would be provided all around the tower 310, and in plan view may show, for example, four, six, or eight structures 320 arranged radially around the tower 310. A series of pods 324 are distributed along the length of the elevator core structure 312, such that there may be a pod 324 between each pair of neighboring core segments 314. In this specific embodiment, the pods 324 have the same diameter as the core segments 314. The space elevator tower 310 shown in FIG. 2C has an anchorage 326 at the base of the elevator core structure 312 that extends into the ground beneath the space elevator tower 310 to provide greater stability to the space elevator tower 310, and it will be understood that such an anchorage 326 can be provided for any of the embodiments shown.

FIG. 2D illustrates an alternative embodiment of the space elevator tower 410 having an upper end 411 and a lower end, or main tower portion, 413. The lower end 413 comprises a plurality of core segments 414 stacked end-to-end. The elevator core structure 412 supports a main pod 416 and a platform 418 at the upper end 411 of the space elevator tower 410. The core segments 414 have a variety of diameters such that the core segments 414 are progressively narrower from the base of the elevator core structure 412 to the upper end of the elevator core structure 412.

FIG. 2E illustrates an alternative embodiment of the space elevator tower 510 having an upper end 511 and a lower end, or main tower portion, 513. The lower end 513 comprises a plurality of core segments 514 stacked end-to-end along the length of the elevator core structure 512. The elevator core structure 512 supports a main pod 516 and a platform 518 at the upper end 511 of the space elevator tower 510. A series of pods 524 are distributed along the length of the elevator core structure 512, such that there may be a pod 524 between each pair of adjacent core segments 514. The pods 524 have a larger diameter than the core segments 514, but may have a different diameter. The space elevator tower 510 shown in FIG. 2E has an anchorage 526 that extends into the ground beneath the space elevator tower 510 to provide greater stability for the space elevator tower 510.

Figure 3A:
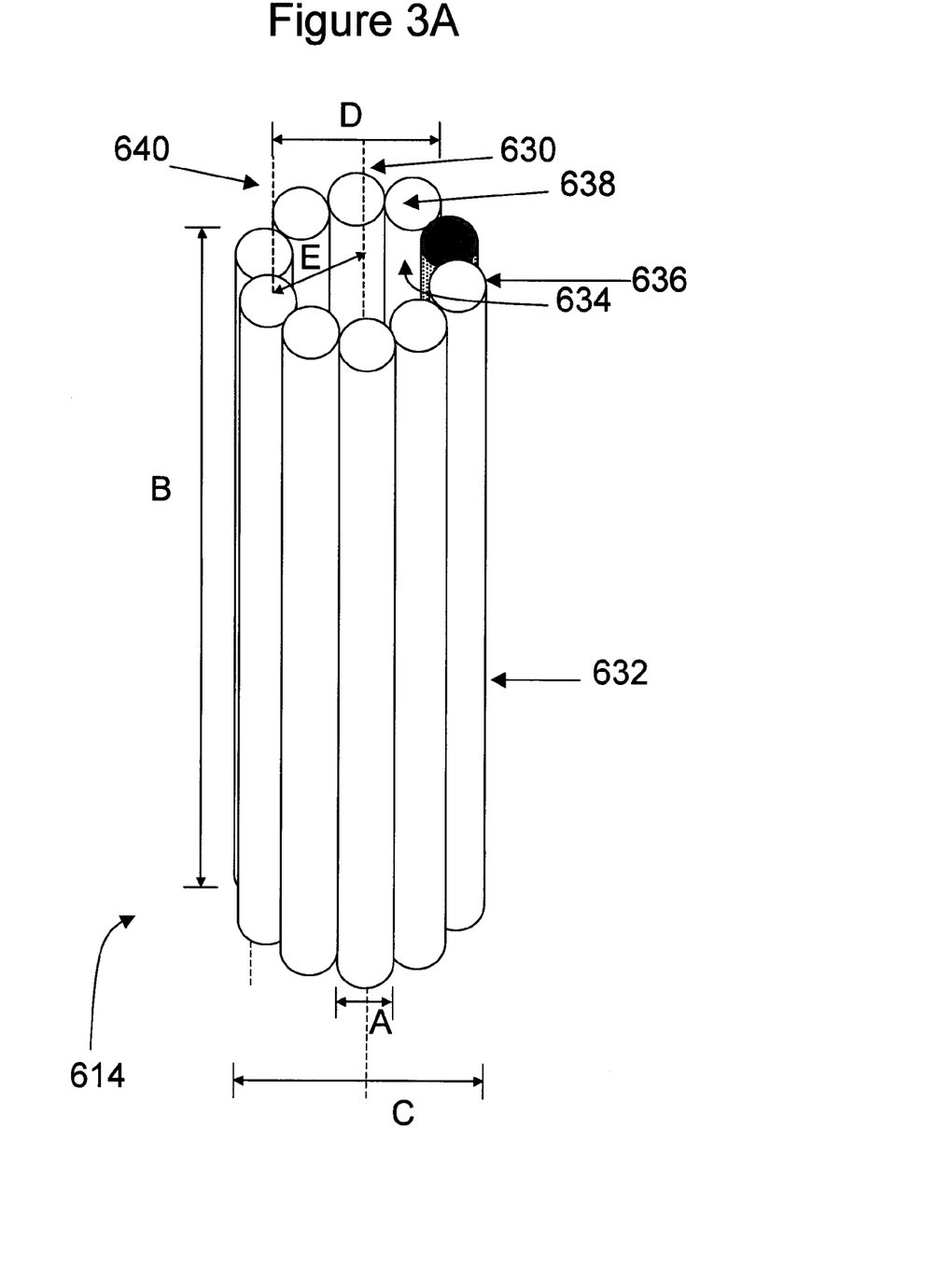
FIG. 3A is an isometric view showing one embodiment of the structural components of a core segment.

FIG. 3A illustrates the structural components of a core segment 614 built in accordance with the present invention. The core segment 614 has a hollow cylindrical shape with a longitudinal axis 630, a wall 632 with a thickness A disposed circumferentially around the longitudinal axis 630, and an inner wall surface 634 and an outer wall surface 636. The core segment 614 has a length B along the longitudinal axis, and has an outer diameter C, and an inner diameter D=(C−2A), which corresponds to the thickness A of the wall 632.

In this embodiment, the wall 632 of the core segment is composed of a plurality of adjacent hollow cylindrical pressure cells 638 having the same length as the core segment 614, having mutually parallel longitudinal axes 640, parallel to the longitudinal axis 630 of the core segment 614, and arranged in a single ring at a constant radial distance E=(D+A)/2 from the longitudinal axis of the core segment.

The pressure cells 638 are hollow and are filled with a pressurized gas. The walls of the pressure cells 638 consist of a material with very high mass-to-tensile strength properties, for example, boron or a Kevlar polyethylene composite at a thickness able to retain the cell pressure with adequate margins and according to engineering practice. The material of the walls is otherwise generally sheet-form and flexible, i.e. by itself it provides no significant strength in compression. The number of pressure cells 638 will be related to the diameters C, D and the wall thickness A (the diameter of each cell 638).

Figure 3B:
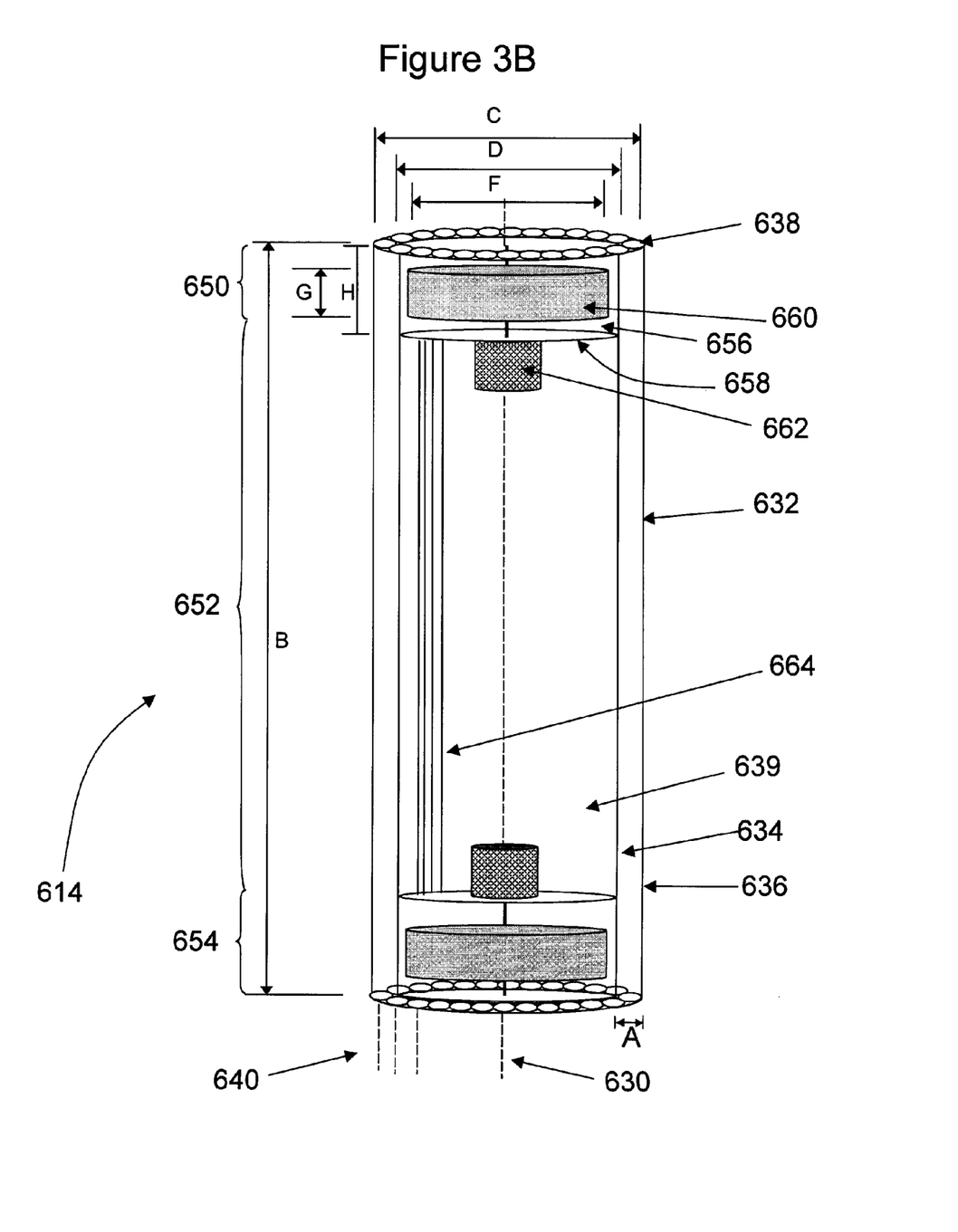
FIG. 3B is an isometric and cutaway view of one embodiment of the structural and mechanical components of a core segment.

FIG. 3B illustrates the structural and mechanical components of one embodiment of the core segment 614 according to the present invention. It is to be appreciated that the core segment of the present invention is not limited to the following example and that features of the following configuration may be combined to produce further variations of the core segment without departing from the scope of the present invention.

The core segment 614 has a longitudinal axis 630, a wall with a thickness A and an inner wall surface 634 and an outer wall surface 636 positioned circumferentially around the longitudinal axis 630, forming a cylindrical shape with a hollow interior cavity 639. The core segment 614 has a length B along its longitudinal axis 630, an outer diameter C and an inner diameter D.

The wall 632 is composed of a plurality of adjacent hollow cylindrical pressure cells 638 having the same length as the core segment 614, having mutually parallel longitudinal axes 640, parallel to the longitudinal axis 630 of the core segment 614, arranged in a single ring at a constant radial distance E=(D+A)/2 from the longitudinal axis 630 of the core segment.

The core segment 614 has an upper end 650, a midsection 652 and a lower end 654 distributed continuously along the core segment 614. At the upper end 650 of the core segment 614, the hollow interior cavity 639 of the core segment 614 houses a vacuum chamber 656 having an inner diameter D and a depth H. The vacuum chamber 656 is sealed from the midsection 652 by a pressure deck 658 having a diameter D spanning the inner wall 634 of the core segment 614. A gyroscopic wheel 660, coaxial with the core segment 614, having a diameter F smaller than the inner diameter D of the vacuum chamber 656 and having a depth G smaller than the depth H of the vacuum chamber 656 is rotationally suspended in the interior of the vacuum chamber 656. A similar vacuum chamber 656 and gyroscopic wheel 660 are located at the lower end of the core segment 614.

The core segment 614 further comprises a machinery housing 662 located on the pressure deck 658 in the midsection 652 of the interior cavity 639 of the core segment 614. The machinery in the machinery housing 662 includes compressor machinery, gyroscopic machinery, and other control machinery (not shown). The gyroscopic machinery provides the rotational momentum of the gyroscopic wheel 660. The compressor machinery maintains a low pressure condition in the vacuum chamber in order to reduce viscous drag on the gyroscopic wheel 656, maintains the pressure in the pressure cells 638, and redistributes gas as required. Gas and power conduits 664 run through the hollow interior cavity 639 of the core segment 614 to distribute gas, power and interconnect with other segments as required.

Unless the pressure cells 638 are pre-pressurized and in case of leakage, the compressor machinery (not shown) is required to pump gas into the space elevator tower 10. Compressor machinery may be sized by predicting and monitoring pressure cell 638 leak rates with time and also including a margin for space elevator core structure 12 pneumatic control. Alternatively, a high pressure gas line may be utilized to pressurize and control the elevator core structure 12 with compressor machinery and pressure reservoirs mounted on the ground or mounted on only some of the segments 614.

The gyroscopic wheels 660 are heavy spinning wheels or gyroscopes that increase the angular momentum of the elevator's core structure in order to stabilize its orientation in space. Conveniently, the wheels may also be adapted to act as compressors and pressurize the structure. The wheels are spun at high radial velocities in order to ensure that a significant fraction of the structure's angular momentum is stored in their motion. The gyroscopic wheels 660 normally operate continuously while the elevator core structure 12 is in operation and are duplicated throughout the elevator core structure 12 so as to ensure redundancy and downtime for maintenance access. The wheels may alternatively be installed inside the pressure cells 638 so as to induce vortices in the support gas to further enhance the gyroscopic mass.

In a single wheel design, the gyroscopic wheel 660 is orientated to spin with its axis aligned with the elevator core structure 12 such that horizontal forces applied to the elevator core structure 12 are transferred to processional motions in the core. Other gyroscopic systems as are known in the art may also be installed in the space elevator tower 10.

The control machinery may also include active damping systems that enhance the structure's ability to damp oscillations. In one embodiment, the control machinery permits the leaking of air from one pressure cell 638 to another pressure cell 638 using a control valve network or arrangement including fluid dampers. This machinery may be controlled and powered by pneumatic or electrical means as is convenient and can provide a means to communicate with elevator components. The elevator core structure 12 will be arranged along a linear axis such that the sums of centripetal, gravitational and external forces are minimized in the horizontal axes.

Figure 4A:
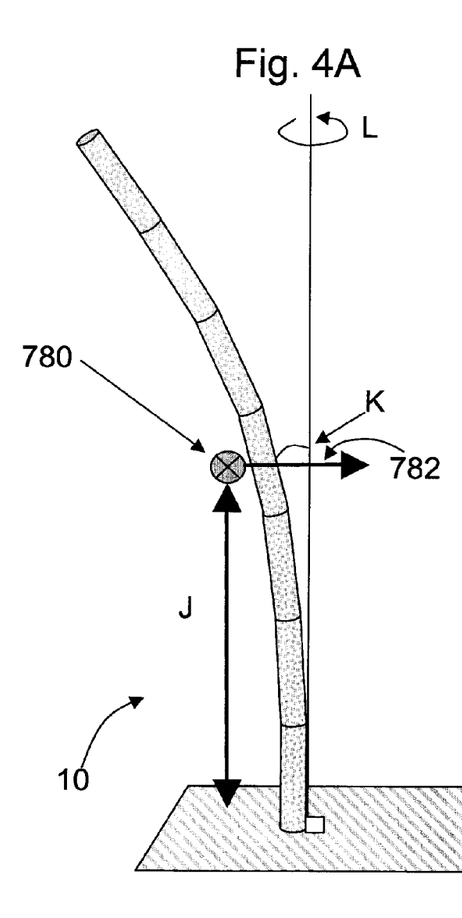
FIG. 4 is a schematic diagram showing active stabilization control of the elevator core structure.
Figure 4B:
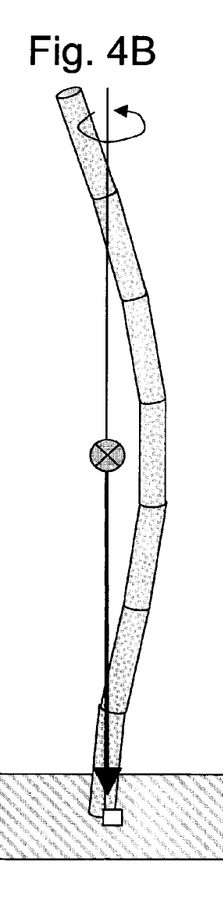
Figure 4C:
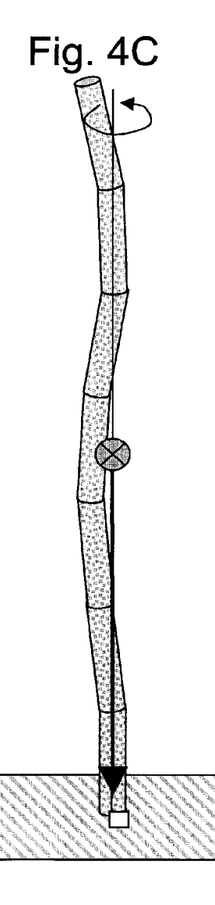

Active control machinery may be implemented to stabilize the structure against buckling or falling and to couple disturbance torques into other axes. FIG. 4A illustrates a typical harmonic control strategy. The primary control is exerted on the first bending harmonic of the core structure. A space elevator tower 10 with center of mass 780 at an altitude J under deformation by an external torque 782 must utilize a control law and actuator system (not shown) in order to adjust the center of mass 780 such that the attitude of the space elevator tower 10 is at an angle K to the normal in order to counteract the disturbance. Other structure bending moments, such as the examples shown in FIG. 4B and FIG. 4C do not displace the center of mass of the core structure. Consequently, these moments can be controlled independently by the variation of segment pressures along the core at a wavelength and period characteristic of the bending moment.

The tolerance that the controller must meet is determined from the elevator core structure stiffness and bracing, gyroscopic stability and base footprint. The presence of a gyroscopic stabilization system will cause an oscillation L, which is beneficial to control as it provides efficient energy storage of time-varying torques 782; oscillations may be damped by pneumatic damping so as to vary the pressure cell pressures at the elevator core structure harmonic frequencies so as to dampen oscillations actively. The energy that may be extracted by damping is given as the product of rate of change of pressure and sum of the compartment volumes. The control system typically acts on the first six harmonic bending moments of the elevator core structure 12 or until the structural bending modes have a wavelength in the vertical axis of length that is shorter than that of the length of the pressure compartments or a small multiple of that length. The first three moments for control are illustrated in FIG. 4A, FIG. 4B and FIG. 4C respectively. The damping effect may be achieved actively using a high pressure line-and-vent network system and passively by allowing support gas to vent from pressure cell to pressure cell along a connecting line network.

For reliability and repair, a segmented elevator core structure 12 with multiple pressure cells 638 is desirable in order to ensure that elevator integrity can be maintained during maintenance of pressure cells 638 and for leak repair. Failure tolerance can be enhanced by the duplication of subsystems used in other high technology systems, with critical systems such as compressors and gyro-stabilization wheels operated in hot-redundancy mode. A segmented elevator core structure 12 also enables the disassembly of the system during decommissioning and enables the elevator core structure 12 to be dismantled in a top-down process while power and pressure are maintained to the remaining elevator core structure 12 and systems.

Figure 5A:
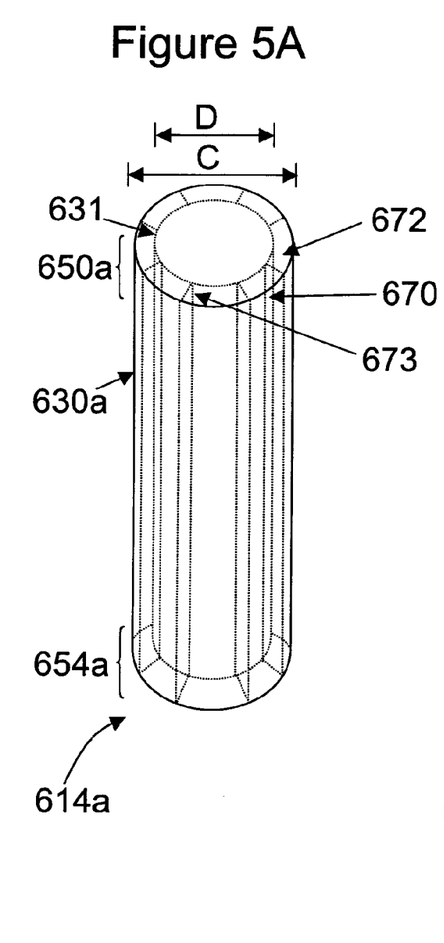
FIG. 5A is an isometric view showing an alternative embodiment of the structural components of a core segment.
Figure 5B:
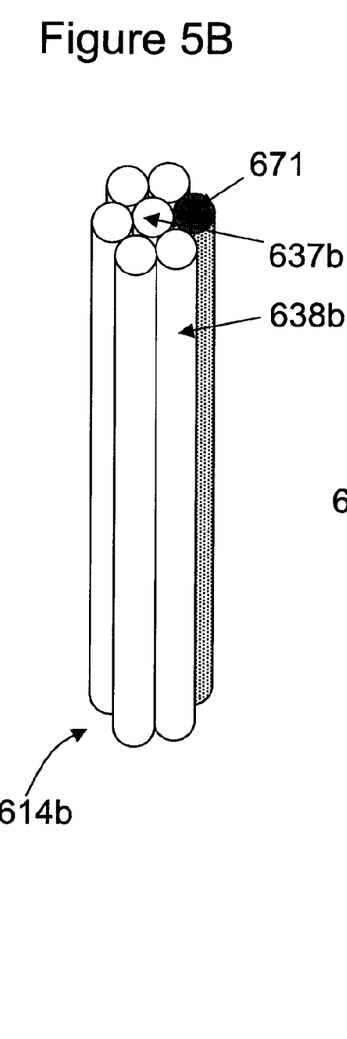
FIG. 5B is an isometric view showing an alternative embodiment of the structural components of a core segment with an interior elevator shaft.
Figure 5C:
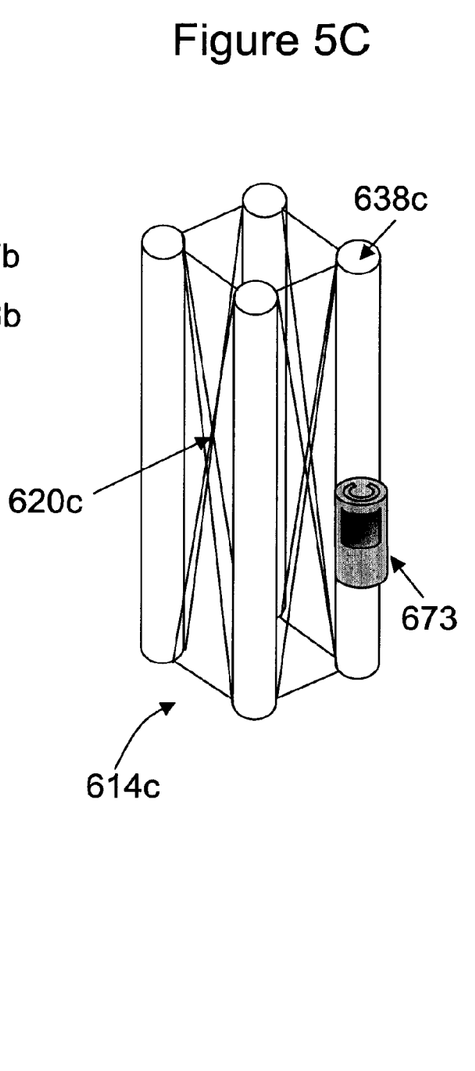
FIG. 5C is an isometric view showing an alternative embodiment of the structural components of a core segment, and also showing an embodiment of an elevator car.

FIGS. 5A-5C show alternative embodiments of the core segment 614 in accordance with the present invention. It is to be appreciated that the core segments of the present invention are not limited to the following examples, and that features of the following configurations may be combined to produce further variations of the core segments without departing from the scope of the present invention. Further variations include, but are not limited to, core segments 14 constructed in a variety of shapes with a variety of numbers of pressure cells 38, and core segments 14 constructed with more than one pressure cell 38 along the length of the core segment 14.

The core segment 614 of FIG. 5A comprises a cylindrical outer wall 630a of diameter C, and a coaxial cylindrical inner wall of diameter D. The cylindrical shell between the outer wall 670 and inner wall 631 is divided into a series of pressure compartments 672 by baffles 673 that span the radial distance between the inner wall 631 and the outer wall 670 and extend from the upper end 650a of the core segment 614 to the lower end 654a of the core segment 614. The pressure compartments 672 are pressurized with air or another suitable gas.

The core segment 614b of FIG. 5B is similar to the core segment 614 shown in FIGS. 3A and 3B. The core segment 614 of FIG. 5B is not hollow, but instead has an additional pressure cell 637b inside the ring of parallel pressure cells 638b. FIG. 5B also shows an example of an elevator shaft on the interior of one pressure cell 671 of a core segment 614b.

The core segment 614c of FIG. 5C corresponds to the elevator core structure shown in FIG. 2A. The core segment 614c is comprised of four pressure cells 638c, supported in a four-square configuration by an open lattice brace structure 620c. FIG. 5C also shows an example of an elevator car 673 ascending the exterior surface of a pressure cell 638c.

At typical conditions on the Earth's surface, atmospheric air has a density of 1.29 kg m$^{-3}$. For a pressurized vessel, the pressure variation with altitude may be derived by consideration of the gravitational force on a unit area air parcel as $$g\rho\partial z = -\partial p \qquad \text{Eqn. 1}$$

where g is the force due to gravity (9.8 ms$^{-2}$ on Earth), $\rho$ is the mass density of the gas, p is the pressure and z is altitude.

At atmospheric pressures the behaviour of the gas may be characterized by the ideal gas law as $$p = \rho RT \qquad \text{Eqn. 2}$$

where R is the gas constant in units normalized for Earth's atmosphere and T is the temperature in Kelvin. Assuming a constant pressure cell temperature and approximating gravity as constant over altitude the pressure at the top of a pressure cell of altitude z is calculated by integrating $$p(z) = p_0 \exp(-z/H)$$  Eqn. 3 where $H=RT/g$ and is the scale height of the atmosphere (for Earth, H~7.6 km). The load capacity L in kilograms of a vertical cylinder of length l and diameter d that has no structural strength under compression is therefore $$L = \frac{\pi d^2 p_0 \exp(-l/H)}{4g}$$  Eqn. 4 where $p_0$ is the pressure above the ambient pressure at the base of the cell.

Assuming the case of a simple single pressure cell 638 structure, the mass of such a segment is given as $$m_{element} = \rho_A \pi d l$$  Eqn 5 where $\rho_A$ is the density of the cell wall material. If the pressure cell is in firm contact with the ground, the apparatus must support only this structural mass as the mass of the pressurization gas may be supported from the base. If the pressure cell 638 is further up the structure, the supporting structure must support the pressure cell mass and the mass of the pressurization gas of density $\rho$ which is given as:

$$m_{gas} = \frac{\rho b \pi d^2 H(1 - \exp(-l/H))}{4}$$  Eqn. 6 where b is the absolute gas pressure at the base of a cell. Setting $\rho$ to the density of the ambient environment, this expression can also be used to compute the buoyant mass which is equivalent to the mass of atmospheric air displaced by the core structure. This mass may be subtracted from the mass of the pressurized core structure as it provides support for the core. The center of gravity of the support gas is given by:

$$z_{cofg} = \frac{H(1 - (1 + l/H)\exp(-l/H))}{(1 - \exp(-l/H))}.$$  Eqn. 7

In some alternative embodiments, other gases may be utilized with lower molecular masses than that of air. The mass advantages of other pressurization gases may be approximated by the ratio of their molecular mass with that of nitrogen gas (the dominant constituent of atmospheric air). Thus a structure pressurized with hydrogen will require 28/2=14 times less gas by mass and with helium 28/4=7 times less.

The force required to buckle a column under load is given as:

$$L_{buckling} = \frac{\pi^2 E I}{l'^2}$$  Eqn. 8 where l' is the effective column length, E is the effective Youngs modulus of the wall material when the core is pressurized and I is the area moment of inertia. If the elevator core structure is braced from the base and gyroscopically pinned at the top l'=l. For a cylinder, $I=\int y^2 dA = 2\pi t r^3$ where t is the thickness and r is the radius.

These results can be applied to an embodiment of a core design for an Earth-based elevator to access near space at 20 km altitude. In a specific embodiment, the elevator is constructed at 5 km altitude in one of four regions on the equator to reduce the required height of the elevator to 15 km to access 20 km altitude and to utilize advantageously the spin of the Earth.

Assuming an elevator core structure comprising core segments of the embodiment shown in FIG. 5A braced at the base and consisting of Boron pressure cells of constant wall thickness 1.2 cm, the core segment having a hollow cylindrical shape with an inner diameter D=229 m and outer diameter C=230 m, a 15 km elevator core can be supported by 150 bar hydrogen gas. Approximating the structure as two concentric cylinders, the mass of the structure is $7.5 \times 10^7$ kg, and the mass of the pressurization gas needed is $3.3 \times 10^9$ kg.

Constructed at 5 km altitude, the elevator core structure has a buoyant mass of $1.2 \times 10^7$ kg giving a total mass of $3.31 \times 10^9$ kg. The load capacity of the elevator core structure, in excess of that needed to support itself is $1.18 \times 10^7$ kg of force equivalent. The buckling load at the top is $4.1 \times 10^8$ kg, and at the center of gravity (located at 5.2 km up the core) the critical load is $3.36 \times 10^9$, which exceeds the building mass by $5 \times 10^7$ kg, including the mass of the pressurization gas, indicating that the core is structurally stable and able to support the raising of payloads of mass in excess of 100 tonnes.

Further margin may be obtained by tapering the thickness of the walls of the core segments, such that the walls are thinner at the upper end of the elevator core structure than at the base of the elevator core structure, lowering the center of gravity and reducing the structural mass. Alternatively, the core diameters may be tapered to increase the structural stiffness in the base. Additionally, the core can be segmented and pressurized equivalently without inducing an imbalance of support forces between segment walls. Other core designs may be analyzed by comparison with the two-cylinder design and by appropriate adjustment for the amount of wall material utilized.

Access to Low Earth Orbit (LEO) may be provided by means of a launch station located conveniently at the upper end 11 of a space elevator tower 10, where spacecraft without internal propulsion systems may be mated to conventional space-propulsion systems such as an orbital transfer vehicle that can provide the additional kinetic energy required to enter LEO. The energy and, consequently, the propellant needed for LEO is significantly reduced compared with surface launch due to the absence of a drag force experienced during atmospheric ascent and to the potential energy gained by being launched at high altitude.

Figure 6A:
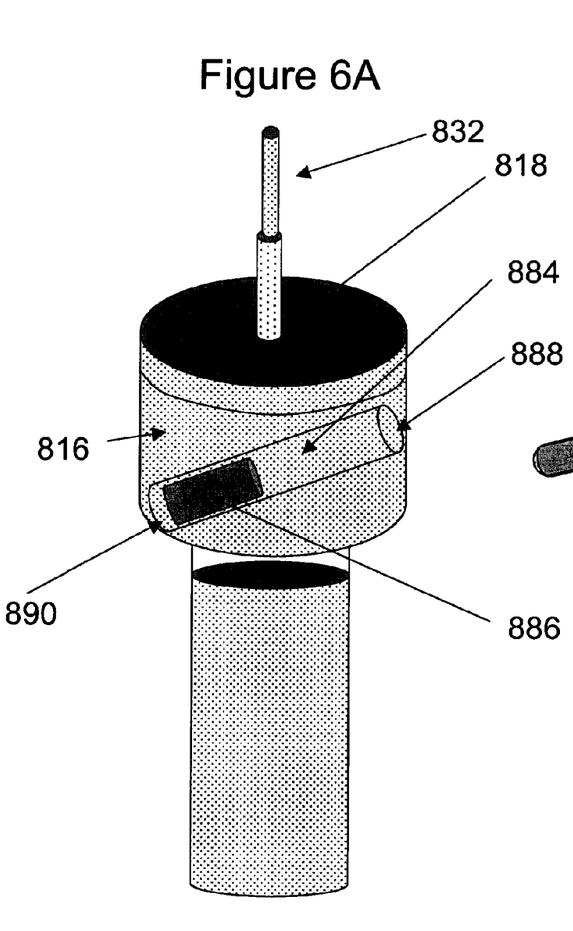
FIG. 6A is an isometric view showing an embodiment of a payload launch system.
Figure 6B:
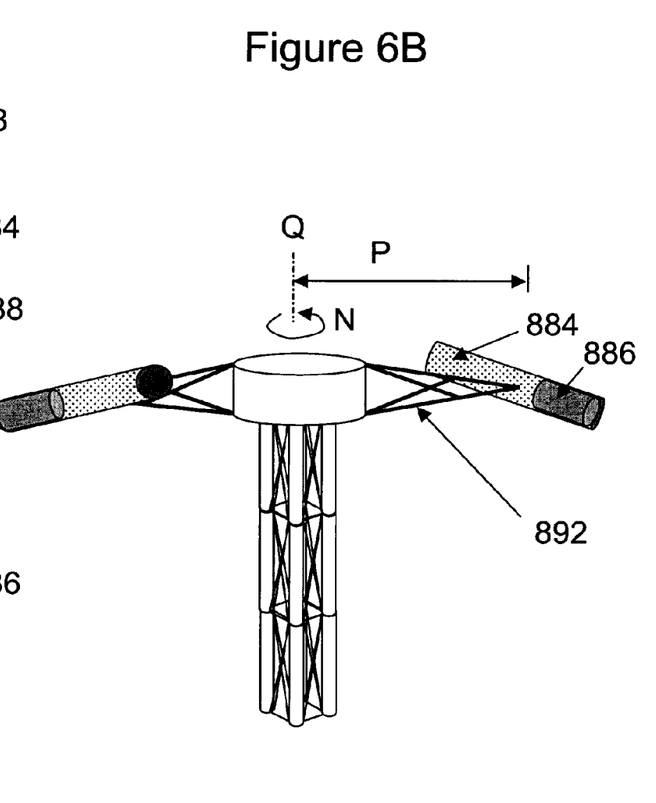
FIG. 6B is an isometric view showing an alternative embodiment of a payload launch system.

FIGS. 6A and 6B show two launch-system configurations. It is to be appreciated that the launch systems of the present invention are not limited to the following examples, and that features of the following configurations may be combined to produce further variations of the launch systems without departing from the scope of the present invention.

The launch system shown in FIG. 6A provides a static main pod 816 for communications and tourism with an integral launch tube 884 inclined to inject a payload 886 through a port 888 in the side of the main pod 816. A gyro-stabilization system (not shown) is provided to translate launch shocks into oscillatory elevator core structure motion in order to enable damping. The back end 890 of the launch tube 884 may be pressurized before payload 886 release in order to have the payload 886 clear the space elevator tower 10 before chemical propulsion engines (not shown) are engaged.

The launch system shown in FIG. 6B makes use of an additional centripetal motion of angular rate N radians per second. Launch tubes 884 are mounted or deployed on a truss structure 892 such that the center of mass of the payload 886 is a distance P from the axis of rotation Q. In this configuration, an additional velocity, the product of N and P, is given to the payload 886 before release. The payloads 886 are released by damping the rotational motion such as to eject the payloads 886. The rotating mechanism may be mass balanced about the axis of rotation.

Figure 7A:
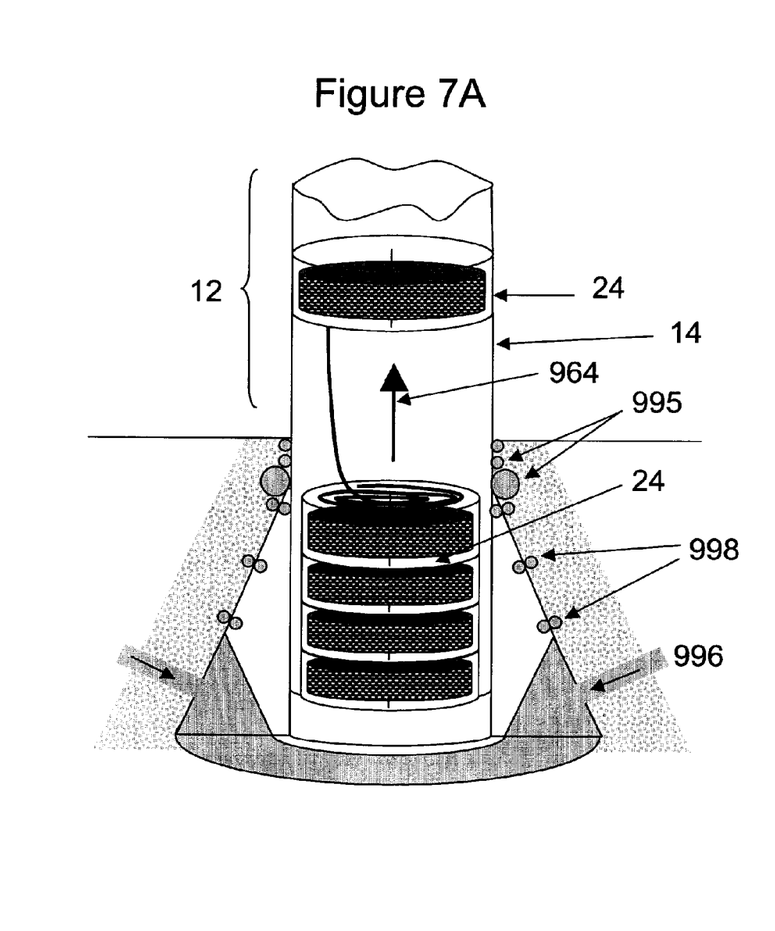
FIG. 7A is an isometric view showing a method of constructing an elevator core structure.
Figure 7B:
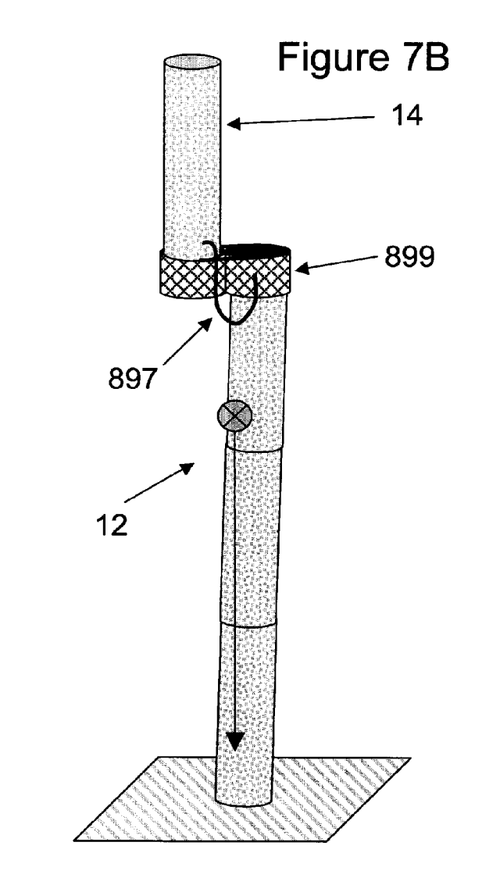
FIG. 7B is an isometric view showing an alternative method of constructing an elevator core structure.

FIGS. 7A and 7B illustrate methods of constructing the space elevator tower 10. It is to be appreciated that the construction methods of the present invention are not limited to the following examples, and that features of the following configurations may be combined to produce further variations of the construction methods without departing from the scope of the present invention.

In the method shown in FIG. 7A, the elevator core structure 12 is erected vertically using a mechanism that extrudes core segments 14. Pods 24 containing control and stabilization machinery are embedded in the elevator core structure 12 as it is extruded by a roller system 995 from a stack of similar pods 24. Gas and power conduits 964 are lifted with each pod 24. The core segment walls and pressure compartments are formed as an extrusion molding of a liquid core material 996. Optionally, a winding mechanism 998 embeds fibers into the elevator core structure 12 in order to increase the elastic resistance of the structure. Pneumatic pressure and a roller mechanism may be used to raise and lower core sections.

FIG. 7B shows an alternative construction approach where core segments 14 are raised by means of a climbing construction elevator 899 that grips the external surface of the existing elevator core structure 12 as it raises and installs segments section by section. Advantageously, core segments 14 equipped with stabilization systems (not shown) may be energized by means of an umbilical connector 897 such that the new core segment 14 may be raised completely above the construction elevator 899 and installed on the existing elevator core structure 12 by means of a horizontal track (not shown) installed on the top of the construction elevator 999. The center of mass of the combined system may be adjusted actively during the core segment installation in order to maintain it over the elevator core structure's 12 surface footprint and to provide support for the elevator core structure 12 in the presence of external disturbance torques.

Figure 8:
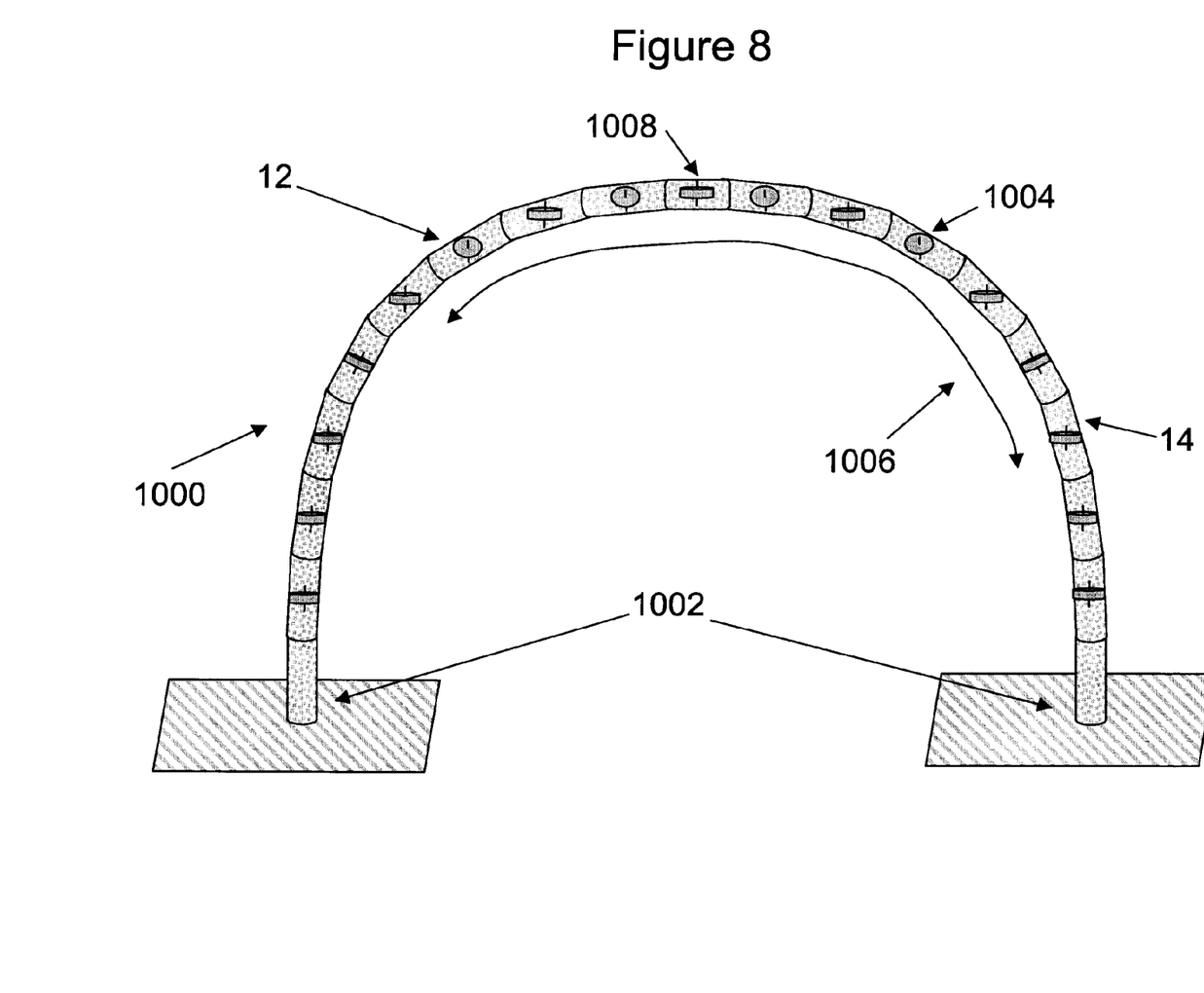
FIG. 8 is an isometric view showing an alternative application of the elevator core structure.

FIG. 8 shows an alternative application of the elevator core structure 12. With two or more ends in fixed contact with the ground the elevator core structure 12 may be utilized as a mass transit system 1000 to move passengers and cargo from one location to another. This structure may be deployed to connect densely populated suburban areas or to provide a permanent link to replace aviation routes. FIG. 8 illustrates a typical transit configuration with two ends 1002 that provide surface arrival and destination points and a gyro-stabilised core segment 14 arrangement of constant exterior diameter with gyros 1004 arranged such that their spin axes are substantially orthogonal to the segment's long axis 1006 in the regions near the apex 1008 of the core structure and are oriented with their spin axes parallel to the segment's long axis near the bases 1002.

Figure 9:
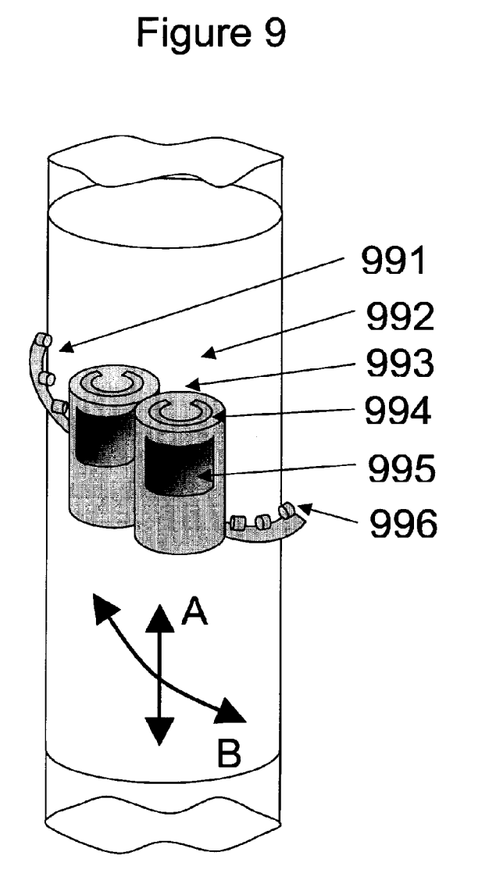
FIG. 9 is an isometric view showing an embodiment of an elevator car and also illustrating a method of gripping the core structure.

Elevators with devices that grip the outside of a cylindrical core in a spiral arrangement may allow cars to pass each other and enable bi-directional travel along the core. This configuration is illustrated in FIG. 9, where a spiral mounting arrangement that encompasses at least half the core circumference 991 grips a circular central core structure 992 and supports pressurised elevator cars 993 with airlocks 994 and observation windows 995. Locomotion is achieved, for example, using drive wheels 996 in frictional contact with the exterior of the core segment. In normal operation, the elevator rises or descends the tower (A). When two cars meet, they are able to pass each other by adjusting their motion as (B). In the absence of other car switching mechanisms, only unidirectional travel may be possible, and cars must shuttle payload between stations.

While the present invention has been described in the specific embodiments as an essentially free standing tower (in this context the braced supports of FIG. 2C are considered to be part of the tower), it is to be understood that, where applicable, additional support mechanisms can be provided. Thus, in unobstructed locations, at least lower portions of the tower can be provided with guyed or cable supports. Generally, these do require the cables or guy wires to be attached to the ground at some distance from the tower, thereby requiring unobstructed access to locations some distance from the tower. Further, such cable or guywire supports are likely only to provide an advantage up to certain heights. While cable or guywires can provide useful lateral support to a tower, they do apply a downward force on the tower thereby increasing the requirement for the tower to withstand a vertical compressive load. Additionally, as the length of such cable guide wire increases, the weight of the cables is, effectively, carried by the tower as an increasing downward load on the tower.

Further, while the present invention has been described in terms of a structure that is largely or wholly supported by internal pneumatic pressure, with the structure otherwise being formed from generally flexible, sheet-formed material, it will be understood that, as desired, the structure can comprise, at least in part, rigid elements. In particular, for individual pods located along the main part of the top of the tower, it will likely prove beneficial to have at least some elements of these pods formed from elements and components that are more or less rigid and do not depend upon gas pressure to define the shape or component and to provide structural integrity. Thus, for example, the floor of each pod can be formed, in known manner, with some supporting grid of generally rigid beams, so as to provide a floor that, to users, will appear and feel substantially rigid and inflexible. Attachment of launch and launch systems themselves will also, likely and preferably, be formed from components that are largely rigid and self-supporting, i.e. do not depend upon pneumatic support.

Further, reference in this specification and the claims to 'elevator' are intended to encompass suitable powered mechanisms or devices suitable for moving goods and/or people up and down the tower. In general, the tower is expected to have dimensions so large that unassisted movement of people or goods will be impractical. It is expected that the 'elevator' will comprised individual elevator cars and that these would not be supported on cables, but rather would obtain power from a suitable source and would drive themselves. Nonetheless, for at least portions of the tower, other 'elevator' concepts can be employed, e.g. cable supported elevators and/or other powered lifting devices, such as escalators, and all such powered lifting devices are included within the term 'elevator' as used herein.

The tower of the present invention is intended for installation on any planetary body and would be dimensioned accordingly.

The invention claimed is:

1. A space elevator tower for location on a planetary surface, the space elevator tower comprising:

a pneumatically pressurized structure formed from flexible sheet material, said pneumatically pressurized structure divided into a plurality of segments along a length of the space elevator tower, each of said plurality of segments containing a plurality of cells defining a core, and a plurality of stabilization devices distributed along the length of the space elevator tower;

wherein the plurality of cells are pressurized with a gas to support the pneumatically pressurized structure; and wherein said plurality of stabilization devices is configured to provide active stabilization of the space elevator tower using a harmonic control strategy.

2. The space elevator tower as claimed in claim 1, wherein the space elevator tower includes a main pod at a top of the tower for accommodating personnel or equipment.

3. The space elevator tower of claim 2, further comprising a payload launch system.

4. The space elevator tower as claimed in claim 1, wherein each of said plurality of cells are cylindrical, and said core is defined by a plurality of the cylindrical cells arranged in a circle, said core having a diameter greater than the diameter of each individual cylindrical cell.

5. The space elevator tower as claimed in claim 1, wherein the plurality of cells are arranged in a circle to form the core.

6. The space elevator tower as claimed in claim 1, wherein, for each of said plurality of segments, the plurality of cells are cylindrical and have substantially the same diameter.

7. The space elevator tower as claimed in claim 1, wherein the plurality of cells are located between inner and outer walls, the outer wall defining an exterior surface of the space elevator tower and the inner wall defining the core.

8. The space elevator tower as claimed in claim 1, including at least one elevator mounted for movement in the core of the tower.

9. The space elevator tower as claimed in claim 1, including at least one elevator mounted for movement on an exterior surface of the tower.

10. The space elevator tower as claimed in claim 8 or 9, wherein each said at least one elevator includes motor driven drive wheels, for frictional contact with an elevator guide and support.

11. The space elevator tower as claimed in claim 1, wherein each elevator is provided with at least one of an electromagnetic drive, a cable support, and a drive.

12. The space elevator tower of claim 1, further comprising a brace structure.

13. The space elevator tower of claim 1, further comprising an anchorage extending into the ground beneath the space elevator tower.

14. The space elevator tower of claim 1, further comprising a plurality of pods distributed at a plurality of heights along the pneumatically pressurized structure.

15. The space elevator tower of claim 1, further comprising a plurality of platforms distributed at a plurality of heights along the elevator tower structure.

16. The space elevator tower of claim 3, wherein the payload launch system comprises a static launch tube located in the main pod.

17. The space elevator tower of claim 3, wherein the payload launch system comprises at least one rotating launch device.

18. The space elevator tower of claim 1, wherein the gas is air.

19. The space elevator tower claim 1, wherein the gas is not.

20. The space elevator tower of claim 1, wherein the gas is hydrogen.

21. The space elevator tower of claim 1, wherein the gas is helium.

22. The space elevator tower claim 1, wherein walls of the plurality of cells consist of a material with high mass-to-tensile strength properties.

23. The space elevator tower of claim 1, wherein the flexible sheet material comprises boron.

24. The space elevator tower of claim 1, wherein the flexible sheet material comprises a Kevlar polyethylene composite.

25. The space elevator tower of claim 1, wherein the plurality of stabilization devices further comprise gyroscopic wheels.

26. The space elevator tower of claim 1, wherein the plurality of stabilization devices further comprise gas compressor machinery.

27. The space elevator tower of claim 1, further comprising gas compressor machinery located on the ground.

* * * * *